Oct. 20, 1925.
E. H. PECKINPAUGH
1,557,771
FISH LURE AND METHOD OF MAKING SAME
Filed Aug. 28, 1922
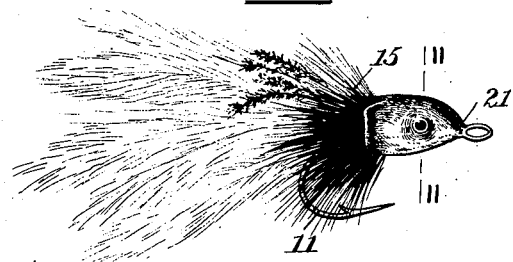
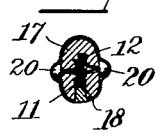
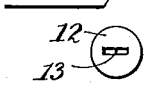
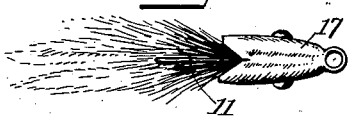
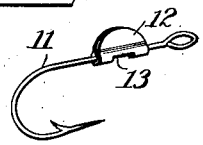
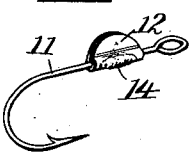
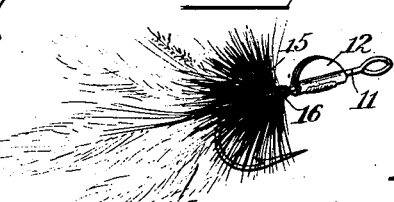
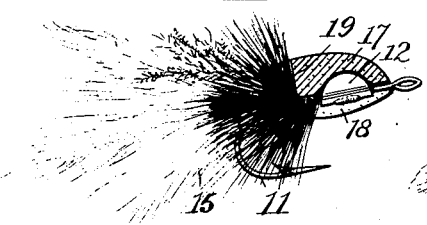
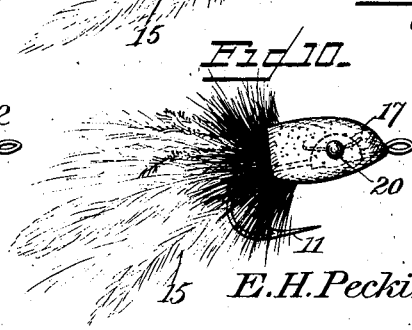
E. H. Peckinpaugh,
INVENTOR,
WITNESSES
BY
ATTORNEY

Patented Oct. 20, 1925.

1,557,771

UNITED STATES PATENT OFFICE.

ERNEST H. PECKINPAUGH, OF CHATTANOOGA, TENNESSEE.

FISH LURE AND METHOD OF MAKING SAME.

Application filed August 28, 1922. Serial No. 584,850.

*To all whom it may concern:*

Be it known that I, ERNEST H. PECKINPAUGH, a citizen of the United States, residing at Chattanooga, in the county of Hamilton and State of Tennessee, have invented new and useful Improvements in Fish Lures and Methods of Making Same, of which the following is a specification.

This invention relates to fish lures and to an improved method of making the same.

The chief objects of the invention are to provide a lure which is more durable and more attractive to fish than the lures commonly found on the market. The invention has, however, many other objects which will appear from the following description of a preferred embodiment.

In the accompanying drawing forming a part of this specification, there is shown by way of illustration a fish lure made in accordance with the invention, wherein—

Figure 1 is an elevation of the finished lure;

Figure 2 is a plan view of the disc employed to hold the hook against turning in the body of the lure;

Figure 3 is a perspective view of the disc of Figure 2 mounted on the hook;

Figure 4 is a perspective view showing the parts of Figure 3 permanently united;

Figure 5 is a perspective view showing the appearance of the bait after feathers or the like have been united to the hook shown in Figure 4;

Figure 6 is a perspective view of the buoyant part of the fish lure;

Figure 7 is a top plan view of the same;

Figure 8 is a longitudinal vertical section showing the buoyant body of Figures 6 and 7 joined to the parts illustrated in Figure 5;

Figure 9 is a perspective view of one of the staples employed to form an eye for the bait;

Figure 10 is an elevation of the bait completed except the enamel coating;

Figure 11 is a transverse section on the line 11—11 of Figure 1;

Figure 12 is a bottom plan view of the finished lure.

Referring more specifically to the drawing which illustrates one embodiment of the invention and a preferred method of making the same, there is shown a hook 11 of any preferred form upon the shank of which, as the first step in my method, there is mounted a metallic disc 12 preferably of brass or other non-corrodible metal. The disc 12 is initially slotted as at 13 and is then bent around the straight shank of the hook at an intermediate point, as shown in Figure 3, and the edges or wings brought together as illustrated. The disc may then be united to the hook by means of a drop of solder 14 placed within the slot 13 so that the disc 12 and hook 11 are permanently secured together with the disc disposed in the plane of the hook and extending in an opposite direction from the point of the hook. Obviously, however, the invention does not depend upon any particular means employed for uniting the hook and disc.

The next step in the process is to attach feathers, hair or the like, or a combination of such materials, suitably colored to the shank of the hook. As shown in Fig. 5, the feathers 15 are tied to the hook, as indicated at 16, at a point immediately behind or below the disc or plate 12. It is preferred that the feathers 15 extend rearwardly of the hook a considerable distance as shown, and that the point of the hook be substantially hidden by the feathers.

Referring now to Figures 6 and 7, there is shown a buoyant body preferably of cork shaped to simulate the head of a minnow, and having a taper from bottom to top as shown in Fig. 7. A slot or kerf 18 having a depth approximating one-third of the height of the cork body is cut from end to end thereof, and a rear slot or kerf 19, which is more or less V-shaped, merges therewith, as seen in Figs. 6 and 8. The cork body 17 is designed to support the hook 11 after the feathers 15 have been secured thereto, and the uniting of these parts of the bait is most easily accomplished by introducing the shank of the hook into the kerf or slot 18 and then forcing the edges of the disc or plate 12 into the interior of the cork body, as seen in Fig. 8. The rear slot 19 serves as a housing for portions of the feather barbs, and the longitudinal slot 18 receives the knot or other feather fastening means 16 which is thereby protected; the result being that the feathers themselves appear to form a body continuous with the cork piece 17. For the purpose of protecting the cut surfaces of cork body where kerf 19 is provided, said kerf may be painted or otherwise treated before the hook and cork body are assembled; and such painting may incidentally enhance the attractive appearance of the bait. The next step is to place the eyes of the bait. I prefer to employ two brass staples 20, one of which is shown separately in Fig. 9 to form the eyes. The staples 20 are forced into the cork body transversely so that their prongs encounter the sides of the plate 12, whereupon the ends of the prongs are bent or upset, thus permanently securing the eyes to the body of the bait (Fig. 11).

The final step in the process is to coat the body 17 with enamel.

The enamel used consists principally of a material like celluloid with other ingredients added to give the proper color and make the application of the same practical. The enamel has elasticity, holds its color regardless of the length of time immersed in the water, and adheres to the material and retains its finish under varying changes of temperature and the changing conditions met with in actual use of fishing. Preferably the enamel is put on in several contrasting colors, and a number of coats are used so that a hard and permanent surface is imparted to the bait. The enamel not only protects the cork body itself against the effects of the water and reduces the skin friction of the bait when trolled, but also fills and closes the slot 18 and makes the union between the hook and the cork body a water-tight one (Fig. 12). Furthermore, the enameled coats the heads of the staples 20 forming the eyes of the bait and entry of water into the cork body near the staples is prevented. The staples are preferably round-headed as shown, and the enamel and glaze repeatedly coated over the staple heads gives to the eyes of the bait a peculiar "beady" or bulging eye effect, which adds considerably to the attractiveness of the bait.

It will be noted that the plate 12 serves not only to prevent turning of the hook relative to the bait body about the axis of its shank but also acts as an abutment to turn the ends of the prongs of staples 20. In removing a bait of this kind from the mouth of a fish, it is necessary to grasp the cork body and use more or less of a twisting motion. The plate increases the bearing surface so that it will not cut through the body when subjected to strain. It will also be noted that the major portion of the cork body is above the shank of the hook and this disposes the center of gravity so that the lure will float with the hook point down, which is the most desirable position to insure hooking a fish. The tapering shape of the cork body previously described materially aids in maintaining the bait in the proper position. While lures have previously been employed having eyes, these usually are of glass and are easily broken or become unscrewed and fall out. The staples 20 cannot be lost, particularly as the enamel coating prevents entry of water and rotting of the cork. The bait is a very durable one and when properly made presents a very striking appearance so that it may be readily marked; yet its cost of manufacture is low.

While I have described a preferred form of lure and one method of making the same, it will be understood that many changes from the above disclosure may be resorted to without departing from my invention, which is best defined in the following claims.

What is claimed is:—

1. An artificial bait comprising a cork body combined with a hook, and means for uniting these two parts comprising a plate of material united to the shank of the hook so as to provide two bendable wings normally disposed in the plane of the hook, and a water resistant coating of enamel applied over the outer surface of the buoyant body to fill the pores thereof and also filling the kerf whereby the interior of the bait is protected against the action of the water.

2. An artificial bait comprising a body having a longitudinal kerf, a hook having its shank inserted in the kerf, and means for uniting said shank to the body comprising a metallic plate bent about the shank and secured thereto, said plate having two wings disposed in the plane of the shank of the hook and extending above the same and uniting the hook to the body and holding the hook from turning in the body when removing the bait from a fish.

3. An artificial bait comprising a cork body having a kerf extending longitudinally and of a depth less than half the height or thickness of the body, and a hook mounting on its shank a plate of non-corrodible and bendable metal, said plate being held at a midpoint to the shank by means applied through a slot provided centrally of the plate and having two wings disposed in the plane of the hook, the shank of the hook being received within the kerf and the wings of the plate being forced into the cork body to interlock therewith.

4. An artificial bait comprising a buoyant body, a hook, and metallic means mounted on the hook and arranged within the interior of the body to hold the hook thereto, and staples thrust into the body transversely on opposite sides so that their heads protrude on each side to simulate eyes, said metallic means acting as an abutment for the staple prongs to deflect the same and thus unite the stables permanently to the body.

5. An artificial bait comprising a buoyant body, a hook, and a plate mounted on the hook shank to present two wings disposed in the plane of the hook, said plate wings having their edges driven into the interior of the body so as to lock the hook upon the body, and round-headed staples thrust into the body transversely thereof on opposite sides at such points that their prongs encounter said wings, which serve as anvils or abutments to deflect or turn the points of the prongs, whereby the staples are secured to the body with their heads only showing and simulating eyes.

6. An artificial bait comprising a buoyant body, a hook, means for joining the hook and body, a pair of artificial eyes for the bait formed from staples whose prongs are embedded into the body and whose heads are exterior to the body, and a coating of waterproof enamel filling the pores of the body and applied over the joints between the body and eyes and over the eyes themselves so as to aid in making the union of said parts a relatively permanent one and to impart to the bait a "beady-eyed" appearance.

7. An artificial bait comprising a body having a logitudinal slot and a rear slot merging therewith, a hook, feathers tied to the hook, the latter being inserted in the longitudinal slot with the tie for the feathers received therein and the feathers partially housed by the walls of the rear slot, and means for securing the shank of the hook to said body with the feathers masking the barb of the hook, whereby the junction of the feathers and the hook is protected and the feathers appear to be continuous with the body when the bait is drawn through the water.

8. An artificial bait comprising a body having a longitudinal slot and a rear slot, a plate bent about the shank of the hook forming two upstanding wings which are presented in the plane of the hook, and feathers attached to the shank of the hook in rear of said plate, said hook and the plate being introduced into the longitudinal slot with the feathers partially received within the rear slot, whereby the junction of the feathers and hook is protected and the feathers appear to be continuous with the body when the bait is drawn through the water.

9. An artificial bait comprising a buoyant body having a longitudinal slot and a rear V-shaped slot merging with the longitudinal slot, a hook having its shank fitted in the longitudinal slot, means for holding the shank of the hook from turning in said slot, feathers attached to the shank of the hook and partly received within the rear slot, and a waterproof enamel applied to the body and filling the pores thereof as well as filling the longitudinal slot so as to protect the interior of the bait against the action of the water.

10. An artificial bait comprising a body having a longitudinal slot and a rear slot, a plate bent about the shank of the hook forming two upstanding wings which are presented in the plane of the hook, and feathers attached to the shank of the hook in rear of said plate, said hook and said plate being introduced into the longitudinal slot with the feathers partially received within the rear slot, and a waterproof enamel applied to the cork body and filling the longitudinal slot.

In testimony that I claim the foregoing as my own, I have hereto affixed my signature.

ERNEST H. PECKINPAUGH.